United States Patent [19]

Inoue

[11] 4,379,960
[45] Apr. 12, 1983

[54] ELECTRICAL DISCHARGE MACHINING METHOD AND APPARATUS USING ULTRASONIC WAVES AND MAGNETIC ENERGY APPLIED CONCURRENTLY TO THE MACHINING GAP

[75] Inventor: Kiyoshi Inoue, Tokyo, Japan

[73] Assignee: Inoue-Japax Research Incorporated, Yokohama, Japan

[21] Appl. No.: 226,417

[22] Filed: Jan. 19, 1981

Related U.S. Application Data

[63] Continuation-in-part of Ser. No. 150,355, May 16, 1980, Pat. No. 4,366,358.

[30] Foreign Application Priority Data

Jan. 22, 1980 [JP] Japan .................................. 55-6632

[51] Int. Cl.³ .................................................. B23P 1/08
[52] U.S. Cl. ................................ 219/69 M; 219/69 G; 219/69 R; 204/129.7; 204/157.15
[58] Field of Search ............... 219/69 R, 69 M, 69 V, 219/69 C, 69 P; 204/129.3, 129.6, 129.7, 156, 157.1 S

[56] References Cited

U.S. PATENT DOCUMENTS

| | | | |
|---|---|---|---|
| 3,194,640 | 7/1965 | Nesh | 204/157.15 |
| 3,378,473 | 4/1968 | Inoue | 204/129.7 |
| 3,533,928 | 10/1970 | Inoue | 204/129.7 |
| 3,567,604 | 3/1971 | Bodine | 219/69 M |
| 3,710,067 | 1/1973 | Ullmann et al. | 219/69 M |
| 4,205,213 | 5/1980 | Inoue | 219/69 M |

FOREIGN PATENT DOCUMENTS

276823 4/1964 Australia .................... 204/129.7

*Primary Examiner*—M. H. Paschall
*Attorney, Agent, or Firm*—Karl F. Ross; Herbert Dubno

[57] ABSTRACT

An EMD method and apparatus, especially for a cavity-sinking type of machining, wherein a combination of magnetic fluxes and ultrasonic waves is applied externally to the region of a machining recess being progressively formed in a workpiece electrode juxtaposed with a tool electrode while the electrodes are displaced relative to one another and a succession of machining electrical pulses are applied across a dielectric flooded machining gap provided therebetween.

29 Claims, 7 Drawing Figures

ELECTRICAL DISCHARGE MACHINING METHOD AND APPARATUS USING ULTRASONIC WAVES AND MAGNETIC ENERGY APPLIED CONCURRENTLY TO THE MACHINING GAP

CROSS-REFERENCE TO A RELATED APPLICATION

This application in part discloses and claims the subject matter disclosed in my copending application Ser. No. 150,355 filed May 16, 1980, now U.S. Pat. No. 4,366,358.

FIELD OF THE INVENTION

The present invention relates generally to the art of electrical discharge machining (EDM) in which a tool electrode is juxtaposed with a workpiece electrode to form a minute machining gap (as small as 10 to 20 microns) in the presence of a machining medium therebetween and a succession of electrical pulses are applied between the tool electrode and the workpiece electrode to produce successive electrical discharges across the gap to electroerosively remove material from the workpiece electrode; as the material removal proceeds, the latter electrode and the tool electrode are advanced relative to one another to progressively form a recess in the workpiece electrode. More particularly, the invention relates to an improved EDM method and apparatus in which the interaction of the high-amperage electrical discharge and an externally applied magnetic field is utilized and applied in a novel manner in the EDM system constituted by the juxtaposed effective surfaces of the machining tool electrode and the machined workpiece electrode in the gap and at which the EDM process proceeds.

BACKGROUND OF THE INVENTION

The proposal to use an externally applied magnetic field in the EDM process dates back to earlier stages in the EDM history. When a magnetic field is applied externally to the region of an EDM gap, the ensuing magnetic flux appears to interact with the high-amperage electrical discharge current flow and cause on media generated in the gap certain dynamic actions which have not yet been fully explained. It has been recognized that these interactions facilitate the production of electrical discharges and allow the effective machining gap spacing to be advantageously enlarged so that an increase in the discharge repetition rate and an enhancement in the removal of machining chips and other products from the gap region may result to promote the stabilized EDM actions and thus to generally improve the EDM process. For the prior art in these particular techniques in which the magnetic field is externally applied in the EDM gap, reference is made to my earlier contributions disclosed in Japanese Patents published under publication No. 29-6942 on Oct. 25, 1954, No. 30-833 on Feb. 11, 1955, No. 30-2943 on Apr. 28, 1955, No. 39-13297 on July 11, 1964, No. 46-11400 on Mar. 23, 1971, No. 46-12520 on Mar. 31, 1971 and No. 54-9759 on Apr. 26, 1979 as well as Japanese Utility Model Registration published under publication No. 31-5790 on Apr. 19, 1956.

In the prior-art proposals, magnetic-field generating means is provided, e.g. one or more coils energized by an external source of direct-current or alternating-current nature and is positioned so as to develop a magnetic flux which is constantly fixed to the electrode system with the resulting magnetic lines of force fixedly traversing the confronting surfaces of tool and workpiece electrodes across which machining actions are in progress. The coil may be wound on the tool electrode or workpiece or both, or alternatively an iron core on which an energizable coil is wound may be located in contact with or in the proximity of the tool or workpiece electrode or both to establish the desired stationary magnetic field.

It has now been found that if it is attempted to gain a uniformity of effects achievable by the exertion of a magnetic field over the entire machining zone or a portion thereof of interest, the use of a fixed magnetic flux or its use alone in a manner according to the prior teaching hardly yields the desired results. Thus, the application of a magnetic flux as positionally fixed often causes an undesirable uncontrolled localization or concentration of electrical discharges, a phenomenon especially noticeable when the workpiece is composed of a ferrous or any other ferromagnetic material. This causes excessive and irregular wear of the total electrode as well as impairment of machining stability and hence a reduction in removal rate.

OBJECT OF THE INVENTION

It is, accordingly, an important object of the present invention to provide an improved EDM method and apparatus wherein the magnetic flux is controlledly applied to the EDM gap region in a manner such that an improvement in machining stability, removal rate and the uniformity and relative electrode wear can be achieved.

Another significant object of the present invention is to provide a novel EDM method and apparatus whereby the applicability of the EDM process is expanded.

SUMMARY OF THE INVENTION

In accordance with the present invention, in a first aspect thereof, there is provided a method of electrical discharge machining wherein a tool electrode is juxtaposed in a spaced relationship with a workpiece electrode to form a minute machining gap therewith in a machining liquid and a succession of electrical pulses are applied between the tool and workpiece electrodes to produce successive electrical discharges across the machining gap, thereby electroerosively removing material from the workpiece and forming a recess therein and wherein the tool and workpiece electrodes are displaced relatively to one another so that the successive material removal progressively advances the formation of the recess in the workpiece electrode, the method comprising the steps of: applying a magnetic field to the region of the said recess for a first time period; applying ultrasonic waves to the region of the said recess for a second period; and providing a third time period in which said first and second time periods coincide with each other at least partly. The magnetic field may be a continuous unidirectional field but is preferably of an alternating nature and is preferably applied in the form of pulses, e.g. unidirectional DC pulses, alternating DC pulses and pulsed or periodically interrupted AC fields. The magnetic field should be of a magnitude in excess of 100 Gauss and preferably greater than 200 Gauss and still preferably not less than 300 Gauss. The ultrasonic waves should be of a vibrational frequency in excess of 10 kHz and preferably between 100 kHz and 5 MHz, and should be of an intensity between 5 and 100 watts and preferably between 10 and 50 watts. The magnetic field and the ultrasonic waves may be applied either substantially simultaneously or substantially alternately; it has been found that it is critical that there be a period in which the magnetic field and the ultrasonic waves coincide at least partly, when they are applied individually to the region of the recess. Preferably, the ultrasonic waves should have a low-frequency component and a high-frequency component superimposed thereon, each having a frequency in the range specified. In this manner, it has been found that a marked improvement in the removal rate, machining stability and cutting uniformity is achieved. Furthermore, an improved surface roughness results which amounts to as fine as 1 and 2 μRmax which has been believed to be impractical heretofore in the art.

In accordance with a second aspect of the invention, there is provided an improved apparatus for electrical discharge machining, having a tool electrode for positioning in a spaced juxtaposition with a workpiece to define a minute machining gap therewith in a machining liquid received in a worktank, power supply means for applying a succession of electrical machining pulses between the tool electrode and the workpiece to produce successive electrical discharges across the machining gap, thereby electroerosively removing material from the workpiece and forming a recess therein and means for relatively displacing the tool electrode and the workpiece so that the successive material removal progressively advances the formation of the recess in the workpiece, the apparatus comprising first means for applying a magnetic field to the region of the said recess for a first time period and second means for applying ultrasonic waves to the region of the said recess for a second time period, the first and second means being operative a third time period in which the first and second time periods coincide with each other at least partly. Timing means may be provided to apply the magnetic field and the ultrasonic waves substantially simultaneously or substantially alternately to the region of the recess. Further, control means may be provided for periodically changing the polarity of the magnetic field when of unidirectional nature or fluctuating the intensity of the magnetic field when of stationary nature as with a DC or AC field supplied by the said first means. The said second means may be adapted to apply to the region of the recess the ultrasonic waves continuously or preferably in the form of a train of time-spaced bursts. The said second means may comprise an electromechanical transducer, e.g. a piezoelectric or electrostrictive element or a magnetostrictive element, energized by a high-frequency power supply operating at a frequency in the range specified. Preferably, two such power supplies having a relatively low operating frequency and a relatively high operating frequency, respectively, are used to energize the transducer so that the ultrasonic waves applied to the region of the recess together with the magnetic field have two frequency components superimposed one upon the other, each of a frequency in the range specified.

The tool electrode together with a shank portion supporting the same constitutes an electrode assembly. Further, the first means and the said second means may be constituted as a compact magnetic-field generating assembly and an ultrasonic assembly, respectively. For the purposes of effectiveness, efficiency, convenience and adaptation to a diverse range of machining modes, it has been found to be desirable to mount the magnetic-field generating assembly and the ultrasonic assemblies to preselected locations of the electrode assembly on.

BRIEF DESCRIPTION OF THE DRAWING

These and other objects, features and advantages of the invention will become more readily apparent from the following description of certain embodiments thereof, taken with reference to the accompanying drawing in which.

SPECIFIC DESCRIPTION

Figure 1:
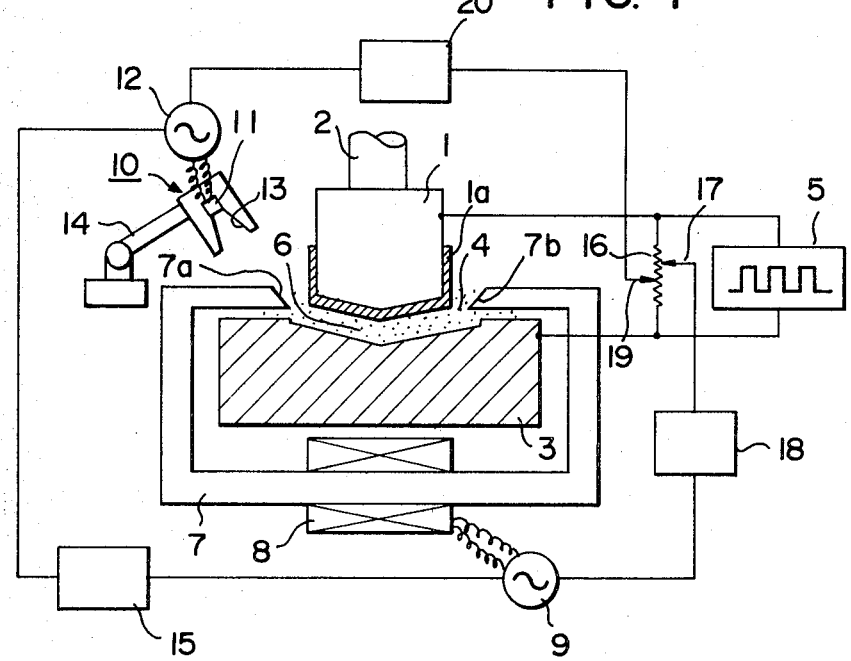
FIG. 1 is an elevational view partly in section, diagrammatically illustrating an EDM system embodying the present invention.

Referring to FIG. 1, an EDM tool electrode 1 is shown supported by an electrode shank 2 and thereby positioned to be juxtaposed with a workpiece 3 to define a machining gap of a width of 10 to 20 microns flooded with a machining liquid 4 which may be a hydrocarbon such as kerosine, or distilled water and is received in a worktank not shown. An EDM power supply 5 is connected electrically to the tool electrode 1 and the workpiece 3 to apply a succession of electrical machining pulses to generate successive electrical discharges across the machining gap between the tool electrode 1 and the workpiece 3, thereby electroerosively removing material from the workpiece and forming a recess 6 therein. The electrode shank 2 is driven by a servocontrol device to displace the tool electrode 1 towards the workpiece 3 so that the successive electroerosive removal of material from the workpiece 3 advance the formation of the recess 6 therein. The servocontrol device is, of course, adapted to respond to a gap short-circuiting or arcing condition and operative to temporarily retract the tool electrode 1 away from the workpiece 3 and to respond to an enlargement of the gap spacing produced by material removal, thereby maintaining the machining gap size substantially constant.

A magnetic-field generating means for applying a magnetic field to the region of the recess 6 in accordance with the present invention comprises a U-shaped ferromagnetic element 7, a coil 8 wound on the element and a power supply 9 for energizing the coil 8. The element 7 has a pair of poles, 7a and 7b, each generally directed towards the recess 6 so that the latter may be traversed by magnetic fluxes generated through the element 7 and emanating from and into the poles 7a and 7b as the coil 8 is energized by the power supply 9. When the tool electrode 1 is composed of a ferromagnetic material such as an iron material, the active machining surface thereof may be coated with a paramagnetic or non-magnetic material 1a such as copper, say, by electrodeposition or adhesion, to prevent the magnetic fluxes from diverging into the electrode 1 and thus to concentrate the fluxes to the region of the recess 6. The power supply 9 may be a DC source to provide a continuous unidirectional magnetic field of a substantially constant intensity, an AC source to provide a sinusoidal AC field, a pulsed DC source to provide a pulsed unidirectional magnetic field of a substantially constant intensity, or a bipolar pulse source to provide a magnetic field with alternating positive and negative rectangular components each with a substantially constant amplitude.

The magnetic field should be of an intensity generally between 100 and 2000 Gauss and, preferably, not less than 200 Gauss and still preferably not less than 300 Gauss. It has been found that such a magnetic field has a strong interaction with the discharge current in the recess 6 such as to lead the machining action to favorable results. Thus, a favorable gap condition is created which facilitates the gap breakdown and spark-over by an individual discrete machining pulse so that successive pulses have a uniform discharge characteristic while permitting the effective spark-over distance of the machining gap to be increased, phenomena attributable to the magnetic tendency of magnetically susceptible particles present in the machining gap and the electromagnetic force acting on the discharge current. It has been found that the gap-breakdown distance is increased from a size of 10 to 20 microns without a magnetic field to a size of 25 to 30 microns.

An ultrasonic means for applying ultrasonic waves to the region of recess 6 in accordance with the invention is designated at 10 and comprises an electromechanical transducer 11 constituted by a piezoelectric, electrostrictive or magnetostrictive element, disposed in contact with the machining liquid 4 and energized by a high-frequency power supply 12 to produce ultrasonic vibrations of a frequency between 10 kHz and 10 MHz, preferably between 100 kHz and 5 MHz. The vibrations are imparted to the machining liquid 4 and thus converted into ultrasonic waves which are directionally focused by means of a horn 13 for selective or preferential application to the region of the recess 6 through the machining liquid 4. The assembly 10 is mounted on a support 14 designed to position the horn 13 with a predetermined distance from the recess 6 and with a predetermined angular orientation. The support member 14 is securely fixed on or in the worktank. The intensity of the ultrasonic waves emitted by the assembly 10 and directed to the region of the recess 6 should range between 5 and 100 watts and, preferably between 10 and 50 watts.

The transducer 11 is preferably energized by more than one frequency supply 12 so that two or more modes or frequencies of ultrasonic waves are applied superimposed one upon the other and transmitted to the region of the recess 6.

It has been found that when a magnetic field and a burst of ultrasonic waves are applied to the region of the machining recess, in accordance with the present invention, in a manner such that a period in which the magnetic field is applied and a period in which the ultrasonic burst is applied coincide with each other at least partly, there are produced more than synergistic effects on improving the machining efficiency and performance as demonstrated in examples which will be set out hereinlater. Thus, a magnetic field of an intensity as specified may be applied continuously while a burst of ultrasonic waves of a vibrational frequency and an intensity as specified is applied intermittently. Conversely, the ultrasonic waves may be applied continuously while the magnetic field is applied intermittently or continuously. The magnetic field and the ultrasonic burst may be applied substantially alternately but it is critical that there is provided a period in which the magnetic field and the ultrasonic burst coincide with each other at least partly. During application, it is sometimes desirable (a) to modify the frequency and/or intensity of the ultrasonic waves with a periodicity or otherwise, (b) to modify the magnitude and/or the direction of the magnetic field with a periodicity or (c) otherwise or to execute a combination of these modifications. It is also desirable to successively change the location at which the magnetic field is directed and/or the location at which the ultrasonic burst is directed in the region of the machining recess to successively sweep the combination effects over the entire area of the latter.

In FIG. 1, therefore, a timing or synchronizing control circuit 15 is connected to the energizing power supply 9 for the coil 8 and to the high-frequency power supply 12 for the ultrasonic transducer 11 to provide a desired timing or synchronizing pattern of the combined application of a magnetic field and an ultrasonic burst to the region of the machining recess 6. To enable a successive sweeping application of the magnetic field, the ferromagnetic element 7 or flux-concentrator may be arranged to be rotated to angularly shift the magnetic flux produced between the opposed poles 7a and 7b, say, about the axis of the tool electrode 1 or shank 2, or a plurality of U-shaped ferromagnetic elements similar to the element 7 may be provided each carrying a coil 8 and successively activated when such individual coils are successively energized by a common or their respective power supplies 9 as provided to develop moving magnetic flux. To enable a successive sweeping application of the ultrasonic waves, the ultrasonic assembly 10 may be arranged to be rotated around the region or the machining recess 6 and a plurality of ultrasonic assemblies 10 may be provided for successive activation to develop a moving ultrasonic burst. It is also desirable to modify a parameter of the magnetic field and/or a parameter of the ultrasonic waves as a function of the condition in the machining gap between the tool electrode 1 and the workpiece 3. To this end, a sensing resistor 16 is shown connected between the tool electrode 1 and the workpiece 3. A voltage sensing tap 17 is connected to the resistor 16 to provide an electrical signal representing the machining gap condition and which signal feeds into a control circuit 18 for modifying the magnitude or the form of the magnetic field at the energization source 9. Another sensing tap 19 is connected to the resistor 16 to provide an electrical voltage signal representing the machining gap condition and which signal feeds into a control circuit 20 for modifying the magnitude and/or the frequency of the ultrasonic waves at the energization source 12. An example of the modification of the parameters is to intensify both the ultrasonic burst and the magnetic field when the gap voltage is sensed to drop below a preset threshold value.

EXAMPLE

An EDM operation is conducted with a succession of electrical machining pulses adjusted to have an on-time $\tau on$ of 30 microseconds, and off-time $\tau off$ of 15 microseconds and a peak current Ip of 0.5 ampere to theoretically yield a surface roughness of 1.8 μRmax. In experiments, the magnetic field and the ultrasonic waves are applied in the following manners:

A. A continuous DC magnetic field of an intensity of 300 Gauss is applied without using an application of ultrasonic waves.

B. A DC magnetic field of an intensity of 1000 Gauss is applied intermittently at a frequency or repetition rate of 10 Hz and no ultrasonic burst is applied.

C. A continuous DC magnetic field of an intensity of 1000 Gauss is used and no ultrasonic burst is applied.

D. No magnetic field and no ultrasonic burst.

E. Ultrasonic waves of 1.6 MHz and 13 watts are applied continuously and no magnetic field.

F. Ultrasonic waves of 20 kHz and 20 watts are applied continuously and no magnetic field.

G. Ultrasonic waves of 36 kHz and 20 watts on which is superimposed ultrasonic waves of 1.6 MHz and 10 watts and no magnetic field.

H. Ultrasonic waves of G above (36 kHz, 20 wattas plus 1.6 MHz, 10 watts) and an alternating magnetic field of 300 Gauss applied at a frequency of 10 Hz.

I. Ultrasonic waves of G or H above and alternating magnetic field of 1000 Gauss at a frequency of 5 Hz.

J. Continuous ultrasonic waves of 20 kHz and 20 watts and a magnetic field of H above.

K. Continuous ultrasonic waves of 1.6 MHz and 10 watts and a continuous DC magnetic field of 1000 Gauss.

L. Continuous ultrasonic waves of 20 kHz and 20 watts and a magnetic field of I above (1000 Gauss, 5 Hz).

The manner used versus the EDM removal rate achieved is set out below.

| Manner | Removal Rate (mg/min) |
| --- | --- |
| A | 2.4 |
| B | 2.5 |
| C | 2.1 |
| D | 2.0 |
| E | 2.6 |
| F | 2.5 |
| G | 2.8 |
| H | 5.7 |
| I | 8.8 |
| J | 3.2 |
| K | 3.4 |
| L | 3.3 |

It has been confirmed that the total or effective intensity of ultrasonic waves applied in the range between 10 and 100 watts has practically no essential effect on the removal rate and a selection of ultrasonic frequencies is rather controlling.

Figure 2:
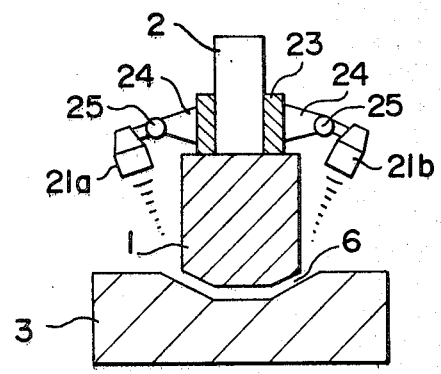
FIGS. 2 and 3 are elevational views partly in section, diagrammatically illustrating an EDM electrode assembly embodying the present invention.
Figure 3:
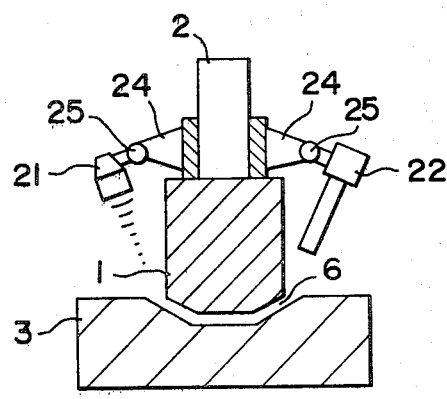

FIGS. 2 and 3 show embodiments of the present invention in which means for applying a magnetic field and means for applying ultrasonic waves are constituted as two assemblies 21 and 22, respectively, both mounted on the electrode shank 2 which supports the tool electrode 1 in a spaced juxtaposition with the workpiece 3. To this end, the shank 2 formed as a cylindrical column may have a collar 23 slidably fitted thereon, the collar having an ultrasonic assembly 21 (FIG. 3) or assemblies 21a and 21b (FIG. 2) and a magnetic assembly 22 (FIG. 3) or assemblies (not seen in FIG. 2) secured thereto, each by means of a support member 23. The collar 23 when slidably fitted on the shank 2 is turned by means not shown to displace the ultrasonic assembly 21, 21a, 21b and the magnetic assemblies 22 so that the region of the machining recess 6 is swept by a combination of magnetic fluxes and ultrasonic waves. Each pair of ultrasonic assemblies 21a, 21b may be arranged in diametrically opposite positions with respect to the tool electrode 1 as shown in FIG. 2 and then a similar pair of magnetic assemblies are arranged in diametrically opposite positions normal to the positions of the ultrasonic assemblies 21a and 21b. Each of the assemblies 21, 21a, 21b and 22 may be attached to the support member 24 via an adjustable hinge 25 to allow it to be swung to establish its angular position as desired to orient the magnetic field and the ultrasonic waves in the direction of the region of the machining recess 6 or a preselected location therein.

Figure 4:
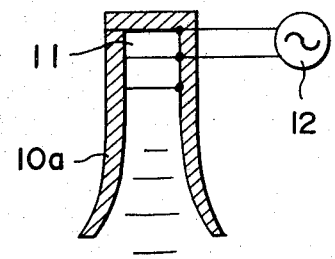
FIG. 4 is a sectional view diagrammatically illustrating an essential portion of an ultrasonic assembly for use with the electrode assembly of FIGS. 2 and 3.
Figure 5:
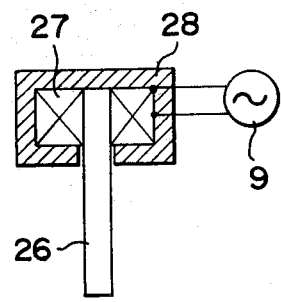
FIG. 5 is a schematic view essentially in elevation, illustrating an essential portion of a magnetic assembly for use with the electrode assembly of FIGS. 2 and 3.

The ultrasonic assembly 21, 21a, 21b may be constituted in a form as shown in FIG. 4, similar to that in FIG. 1, comprising an electromechanical transducer 11 energized by a high-frequency power supply 12 and a wave-directional horn 10a. The magnetic assembly 22 may be constituted in a form as shown in FIG. 5, comprising a ferromagnetic rod 26 having a coil 27 wound thereon at one end proximal to the support member 24 or hinge 25, the coil being energized by a power supply 9 which is shown as an AC source but may be any of the types already described. A casing 28 is used to contain the coil 27 and support the ferromagnetic rod 26 and is supported on the support member 24 to orient the rod 26 in the direction of the region of the machining recess 6.

Figure 6:
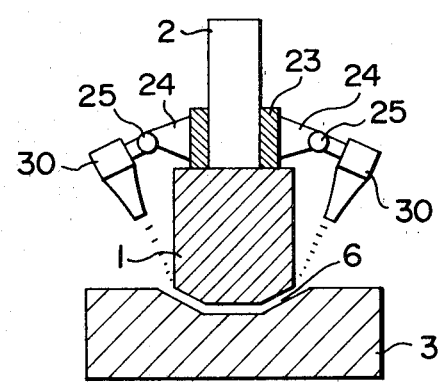
FIG. 6 is a schematic elevational view illustrating a further arrangement for the EDM electrode assembly embodying the present invention.
Figure 7:
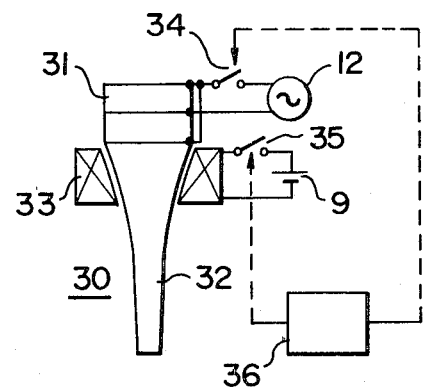
FIG. 7 is a schematic view illustrating an integrated magnetic and ultrasonic assembly for the use with the arrangement of FIG. 6.

The magnetic assembly and the ultrasonic assembly may be integrated into a single unit in the form, for example, shown in FIG. 7 and designated at 30. The unit 30 shown comprises an electromechanical transducer 31 energized by a high-frequency power supply 12 and having attached thereto a solid horn structure 32 which has a coil 33 wound thereon at its end of greater radius. The horn 32 is composed of a ferromagnetic material and provides a magnetic flux when the coil 33 is energized by a power supply 9. A switch 34 is connected between the hih-frequency power supply 12 and the electromechanical transducer 31 and a switch 35 is connected between the power supply 9 and the coil 33, the two switches being controlledly closed by a control circuit 36 to provide a combination of the magnetic flux and the ultrasonic burst synchronously or with a desired timing pattern. A plurality of units 30 are mounted to the collar 23 on the electrode shunk 2, each via the hinge 25 and a support member or carriage 24 as shown in FIG. 6 and in a manner similar to that described with reference to FIGS. 2 and 3.

There is thus provided an EDM method and apparatus which yield improvements in machining efficiency, performance and stability, an increased machining precision and an improved surface roughness which amounts to as little as 1 to 2 μRmax which has been believed to be impossible heretofore in the art.

What is claimed is:

1. A method of electroerosively machining a workpiece, comprising the steps of:
  positioning a tool electrode in a spaced juxtaposition with said workpiece to define a machining gap therewith in a machining liquid received in a worktank;

applying a succession of electrical machining pulses between said tool electrode and said workpiece to produce electrical discharges across said machining gap flooded with said machining liquid, thereby removing material from said workpiece and forming a recess therein;

relatively displacing said tool electrode and said workpiece so that the successive removal of material progressively advances the formation of said recess in said workpiece;

applying a magnetic field of a magnitude not less than 100 Gauss to the region of said recess for a first time period;

applying ultrasonic waves of a frequency not less than 10 kHz through said machining liquid to the region of said recess for a second time period; and providing a third time period in which said first and second time periods coincide with each other at least partly.

2. The method defined in claim 1 wherein said magnitude is in excess of 200 Gauss.

3. The method defined in claim 2 wherein said magnitude is not less than 300 Gauss.

4. The method defined in claim 1 wherein said magnetic field is a unidirectional field.

5. The method defined in claim 4 wherein said field is substantially continuous over said first time period.

6. The method defined in claim 5 wherein said field is intermittently interrupted to provide a pulsed DC field with a pulse duration of said first time period.

7. The method defined in claim 1 wherein said magnetic field is an alternating field.

8. The method defined in claim 7 wherein said alternating field is sinusoidal.

9. The method defined in claim 7 wherein said alternating field has positive and negative components each substantially constant.

10. The method defined in claim 4 or claim 5 wherein said field is pulsed or intermittently interrupted during said first time period.

11. The method defined in claim 1 wherein said ultrasonic waves are of a frequency between 10 kHz and 10 MHz.

12. The method defined in claim 11 wherein said frequency is not less than 100 kHz.

13. The method defined in claim 11 wherein said ultrasonic waves are of an intensity between 5 and 100 watts.

14. The method defined in claim 13 wherein said intensity is not less than 10 watts.

15. A method as defined in claim 1 wherein said tool electrode together with an electrode shank supporting the same constitutes an electrode assembly, further comprising the steps of applying said magnetic field from a field generating assembly mounted to said electrode assembly and positioned in a manner such that a magnetic flux generated thereby traverses said region of said recess and applying said ultrasonic waves from an ultrasonic assembly mounted to said electrode assembly and positioned in such a manner that a burst of the ultrasonic waves generated thereby is transmitted preferentially to said region of said recess through said machining liquid.

16. An apparatus for electroerosively machining a workpiece, having a tool electrode positionable to be spacedly juxtaposed with the workpiece to define a machining gap therewith in a machining liquid in a worktank, power supply means for applying a succession of electrical machining pulses between the tool electrode and the workpiece to produce successive electrical discharges across the machining gap, thereby electroerosively removing material from the workpiece and forming a recess therein and means for relatively displacing the tool electrode and the workpiece so that the successive material removal progressively advances the formation of the recess in the workpiece, the apparatus further comprising:

first means for applying a magnetic field of an intensity not less than 100 Gauss to the region of said recess for a first time period; and second means for applying ultrasonic waves of a frequency not less than 10 kHz to the region of said recess for a second time period, said first and second means being operative to provide a third time period in which said first and second time periods coincide with each other at least partly.

17. The apparatus defined in claim 16 wherein said second means is adapted to produce said ultrasonic waves of a frequency between 10 kHz and 10 MHz.

18. The apparatus defined in claim 17 wherein said second means is adapted to produce said ultrasonic waves of an intensity between 5 and 100 watts.

19. The apparatus defined in claim 16 wherein said first means comprises a ferromagnetic element, coil means wound on said element and a power supply for electrically energizing said coil means to generate a magnetic flux through said ferromagnetic element and through the region of said recess.

20. The apparatus defined in claim 19 wherein said second means comprises an electromechanical transducer, a high-frequency power supply for energizing said transducer to produce ultrasonic vibrations for transmittal to said machining liquid to produce said ultrasonic waves therein for transmittal to the region of said recess through said machining liquid.

21. The apparatus defined in claim 20 wherein said second means further comprises a horn member for substantially focusing said ultrasonic waves to the region of said recess.

22. The apparatus defined in claim 19 wherein said power supply comprises a DC source.

23. The apparatus defined in claim 19 wherein said power supply comprises an AC source.

24. An apparatus as defined in claim 19, further comprising sensing circuit means electrically connected to said machining gap for providing an electric signal representing the condition of said gap, and control means responsive to said electric signal for acting on said power supply of said first means to modify at least one parameter of said magnetic field.

25. An apparatus as defined in claim 20, further comprising sensing circuit means electrically connected to said machining gap for providing an electric signal representing the condition of said gap, and control means responsive to said electric signal for acting on said high-frequency power supply to modify at least one parameter of said ultrasonic waves.

26. The apparatus defined in claim 16 wherein said tool electrode together with an electrode shank supporting the same constitutes an electrode assembly; said first means is constituted as a magnetic-field generating assembly mounted on said electrode assembly and positioned in a manner such that a magnetic flux generated thereby transverses said region of said recess; and said second means is constituted as an ultrasonic assembly mounted on said electrode assembly and positioned in a manner such that a burst of ultrasonic waves generated thereby is transmitted preferentially to said region of said recess through said machining liquid.

27. An apparatus as defined in claim 26 wherein a plurality of such field generating assemblies and a plurality of such ultrasonic assemblies are mounted on said electrode assembly and arranged to surround said region of said recess.

28. The apparatus defined in claim 26 wherein said field generating assembly and said ultrasonic assembly are constituted as a single unit mounted on said electrode assembly.

29. An apparatus as defined in claim 28 wherein a plurality of such units are mounted on said electrode assembly and arranged to surround said region of said recess.

* * * * *